United States Patent [19]

DiPalma

[11] Patent Number: 5,064,167
[45] Date of Patent: Nov. 12, 1991

[54] ADJUSTABLE PACKING ASSEMBLY FOR VALVE STEM

[75] Inventor: Woody C. DiPalma, Katy, Tex.

[73] Assignee: Fike Corporation

[21] Appl. No.: 606,131

[22] Filed: Oct. 31, 1990

[51] Int. Cl.⁵ .............................................. F16K 5/04
[52] U.S. Cl. ................................... 251/214; 277/105; 251/315
[58] Field of Search ............... 251/214, 315; 277/105, 277/106, 110, 112

[56] References Cited

U.S. PATENT DOCUMENTS

| | | | |
|---|---|---|---|
| 3,916,943 | 11/1975 | Hester et al. | 251/214 X |
| 3,917,223 | 11/1975 | Sidler et al. | 251/214 |
| 4,475,713 | 10/1984 | Reed et al. | 251/214 |
| 4,500,092 | 2/1985 | Uomala et al. | 277/112 X |
| 4,940,208 | 7/1990 | Kemp | 251/315 |

Primary Examiner—Martin P. Schwadron
Assistant Examiner—Kevin Lee
Attorney, Agent, or Firm—Dodge, Bush, Moseley & Riddle

[57] ABSTRACT

A ball valve (10) has a stem (36) and a packing (82) about the stem (36). A spring (85) comprises a plurality of Belleville washers (86) biased between the upper cover plate (72) and the packing (82) for exerting a compressive loading against follower (84) and packing (82) for sealing against the stem (36). The upper plate (72) has an enlarged diameter bore portion (76) adjacent the valve body portion (12) and Belleville washers (86) including a load transmitting ring (88) over the Belleville washers (86) are received within the enlarged diameter bore portion (76). Manual threaded adjusting screws (94) extend through the upper plate (72) and have inner ends in abutting contact with the load transmitting ring (88) to restore a compressive loading thereon if the Belleville washers (86) lose their capability to apply a sufficient compressive loading against the packing (82). The outer ends of the adjusting screws (94) receive a suitable manual adjusting tool such as an allen head wrench for adjustment of the screws (94). A thrust ring (98) is compressed between shoulder (52) on the stem (36) and the upper plate (74) by adjusting nut (100) on the stem (36).

15 Claims, 2 Drawing Sheets

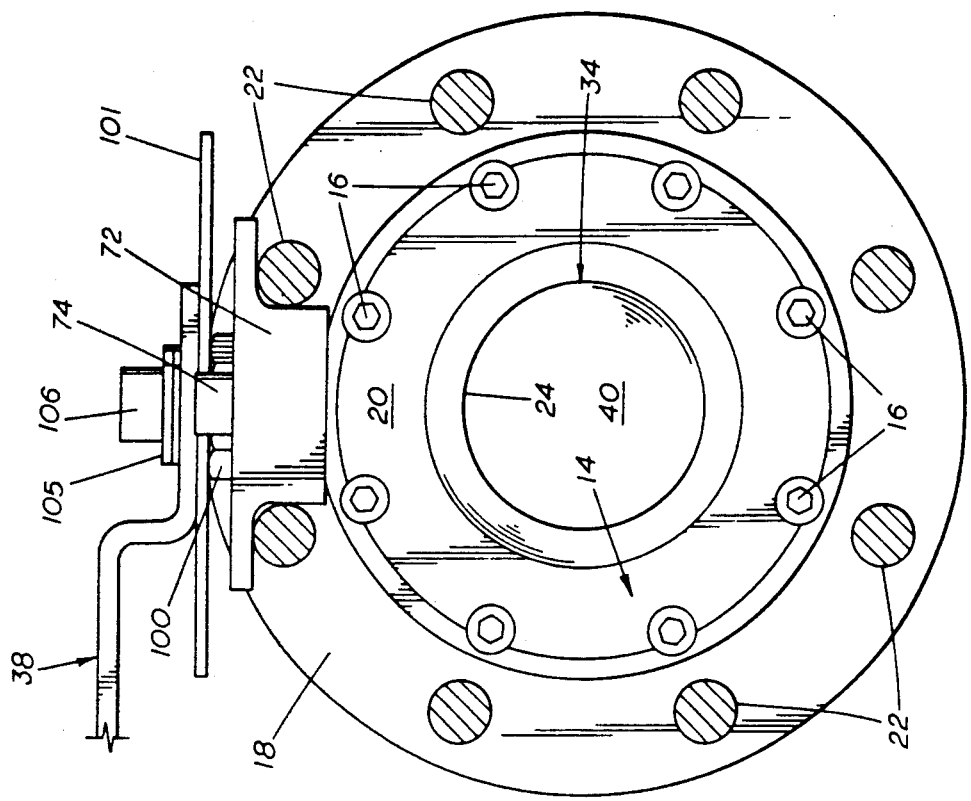
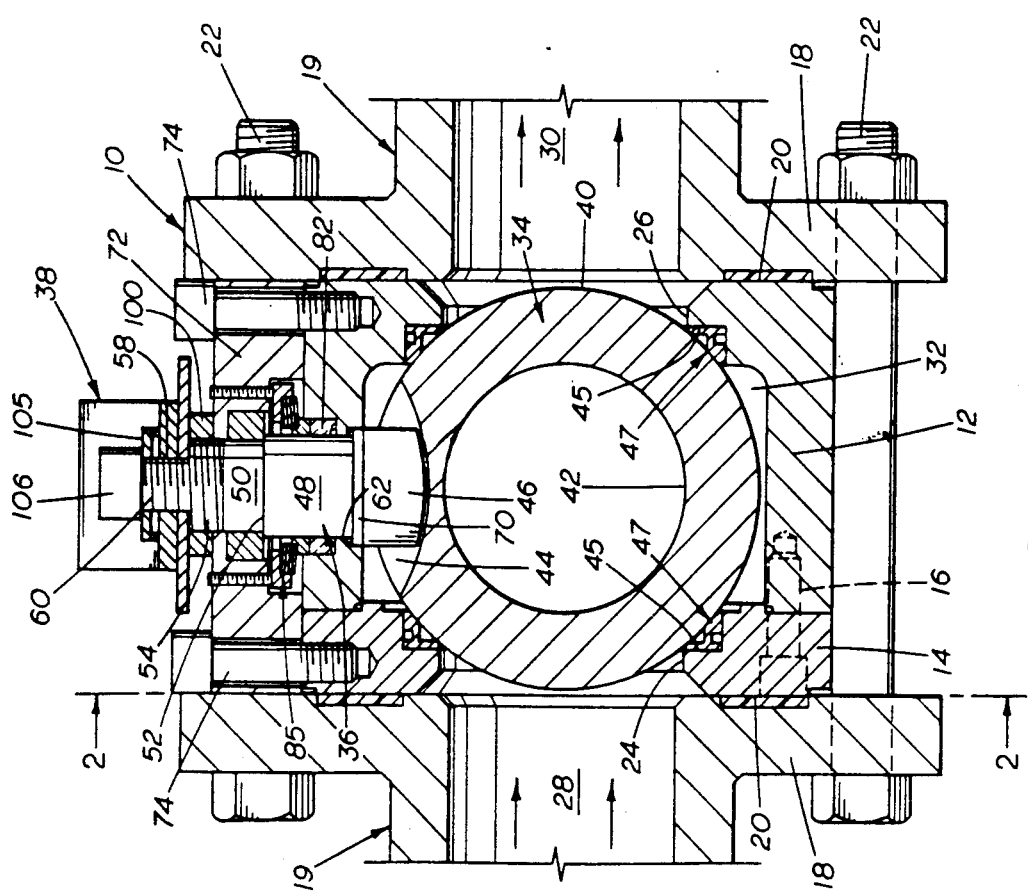
FIG. 2
FIG. 1

ADJUSTABLE PACKING ASSEMBLY FOR VALVE STEM

BACKGROUND OF THE INVENTION

This invention relates to an adjustable packing assembly for rotatable valve stems, and more particularly to such an adjustable packing assembly in which a predetermined compression of the packing against the stem is provided.

Heretofore, as shown in U.S. Pat. No. 4,940,208 dated July 10, 1990, a ball valve has been provided with packing about a stem for rotating a ball valve member between open and closed positions. Belleville washers or springs have been provided for exerting a compressive loading against a follower for the packing which in turn compresses the packing. The force exerted by the Belleville washers against the packing determines the compressive loading of the packing. While a desired compressive loading of the packing may be provided upon initial assembly of the ball valve, deterioration and excessive wear on the packing from prolonged use or possible exposure to corrosive fluids may reduce the compressive loading of the packing below a desired minimum.

SUMMARY OF THE INVENTION

This invention is particularly directed to a packing assembly for a valve stem in which the compressive loading of the packing may be easily adjusted or preloaded a predetermined amount. A spring, preferably a Belleville spring, exerts a compressive loading against a follower for the packing and means are provided for manually adjusting the loading of the spring. The Belleville spring biased between the cover plate and a follower for the packing comprises a plurality of washers which fit within an enlarged diameter recess in the clamping or cover plate for a ball valve body. An inner marginal portion of the Belleville washers surrounds the stem and contacts the follower for the packing with an outer marginal peripheral portion fitting within the recess of the retainer or cover plate. A load transmitting ring or cap is positioned over the outer marginal portion of the Belleville washers and has an inner recess therein receiving the outer marginal portion of the Belleville washers. Adjusting screws extending through the cover plate have their inner ends in contact with the load transmitting ring and have their outer ends exposed above the clamping plate for manual adjustment so that an operator may easily apply a predetermined loading against the Belleville washers and the packing.

The packing is normally loaded at a compressive loading greater than any opposed loading that might result from internal fluid pressure of lading within the valve chamber. Thus, back and forth axial movement or pumping of the packing will not occur. In the event of excessive wear or deterioration of the packing which might result in a reduced compressive loading, the adjusting screws may be easily operated to apply the desired compressive loading against the packing without any disassembly of the valve.

A graphite packing is oftentimes used as a packing material and under very high compressive loads, the graphite containing packing tends to extrude in the spacing between the stem and the valve body. To prevent such extrusion, the packing includes a metal backing ring molded to the inner lower corner of the packing material for contact with the stem and valve body.

It is an object of this invention to provide an adjustable packing assembly for a ball valve stem in which manually operable means are provided to restore a compressive loading of the packing against the stem after the capability of spring means is exhausted.

An additional object of this invention is to provide improved mounting means for a rotatable valve stem including an improved adjustable packing assembly providing a primary seal and a Teflon ring providing a secondary seal.

A further object of this invention is to provide such an adjustable packing assembly in which a Belleville spring is utilized for normally exerting the compressive loading against the packing and manually adjustable means engage an outer marginal portion of the Belleville spring to restore the compressive loading against the packing when the capability of the spring is exhausted.

A further object is to provide compressible packing material for the adjustable packing assembly having an integral metal backing ring molded to the inner corner of the compressible packing material to prevent extrusion of the packing material along the stem.

Other objects, features, and advantages of the invention will become more apparent after referring to the following specification and drawings.

BRIEF DESCRIPTION OF THE DRAWINGS

FIG. 1 is a longitudinal section view of a ball valve structure utilizing the packing assembly of the present invention;

FIG. 2 is an end elevation of the ball valve structure shown in FIG. 1 taken generally along line 2—2 of FIG. 1;

DESCRIPTION OF THE INVENTION

Figure 3:
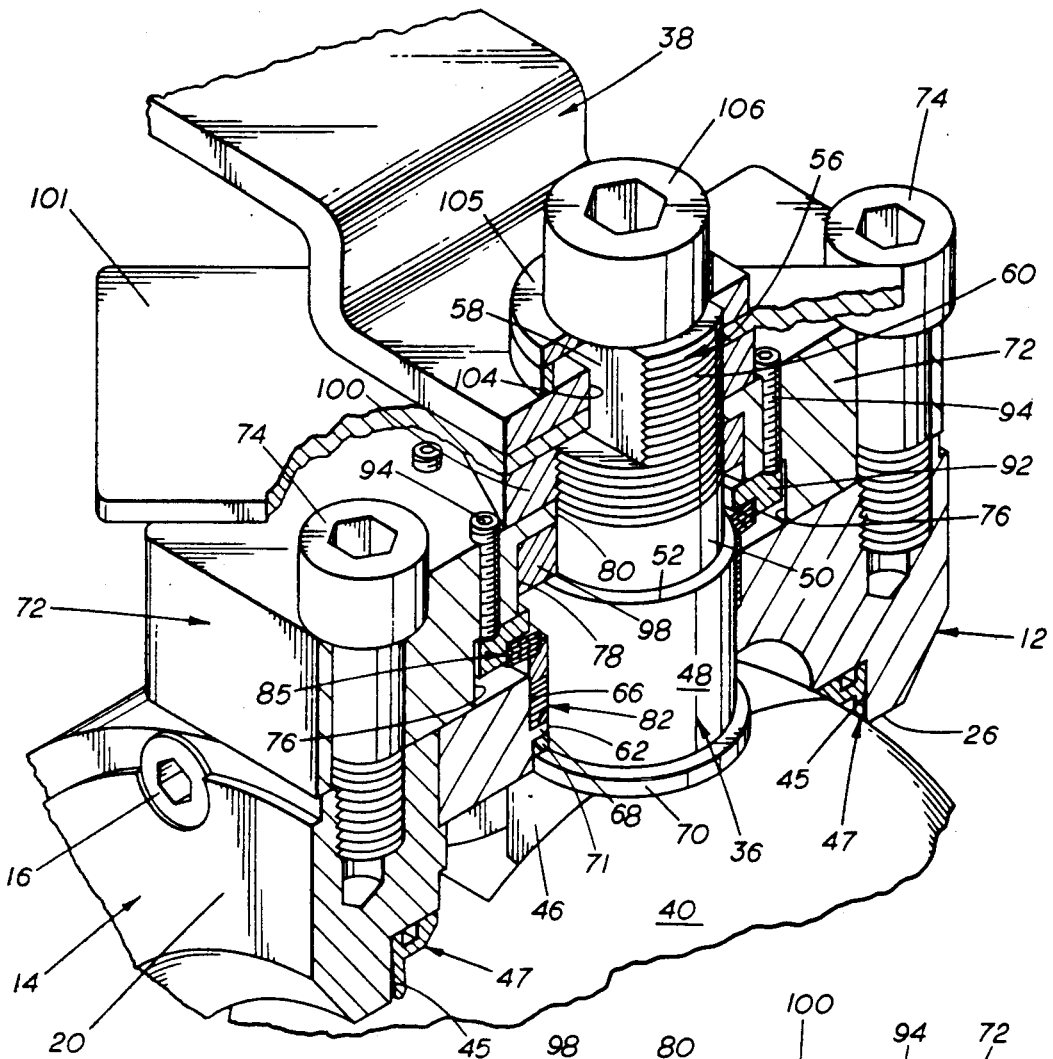
FIG. 3 is an enlarged sectional view in perspective of the upper portion of the valve illustrating the packing assembly about the stem.
Figure 4:
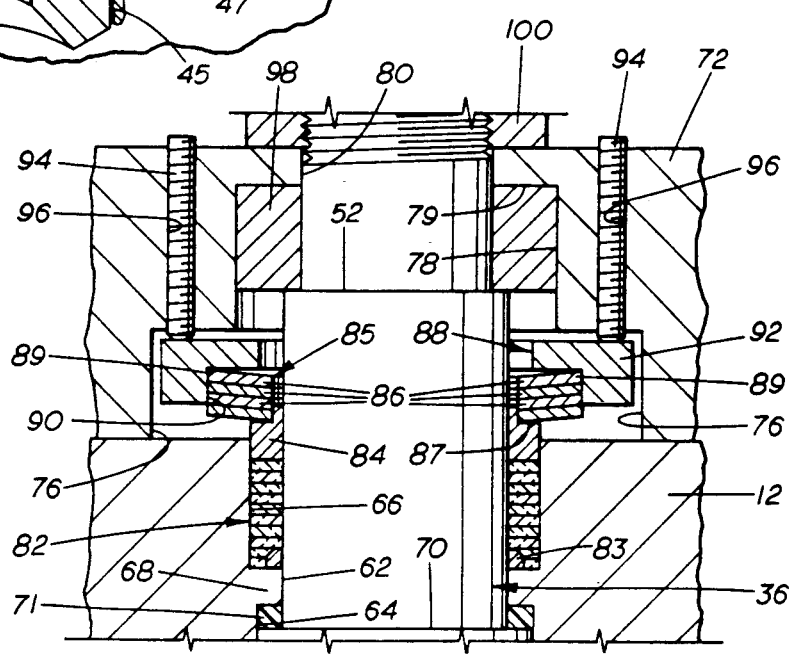
FIG. 4 is an enlarged sectional view of the packing assembly and associated structure about the stem.

Referring now to the drawings for a better understanding of this invention, a spherical plug or ball valve comprising this invention is indicated generally at 10 including a main body portion 12 and an end body portion 14 connected to body portion 12 by a plurality of threaded bolts 16. For connecting ball valve or ball valve structure 10 within a flowline, flanges 18 of a flowline 19 fit on opposed ends 20 of body portions 12 and 14 and nut and bolt combinations 22 clamp ball valve structure 10 tightly therebetween.

Body portion 14 has an inlet opening 24 and body portion 12 has an outlet opening 26. An inlet flow passage is indicated at 28 and an outlet flow passage is indicated at 30. Body portions 12 and 14 define an enlarged diameter valve chamber at 32 and a ball valve member 34 is mounted within chamber 32 for floating movement. A stem generally indicated at 36 has a handle 38 mounted thereon and is adapted to rotate ball valve member 34 between open and closed positions relative to flowline 19.

Ball valve member 34 has a spherical outer surface 40 and a central bore 42 therethrough which is in axial alignment with the longitudinal axes of flow passages 28 and 30 in open position. A slot 44 is provided in the upper surface of ball member 34. Stem 36 has a lower end 46 fitting within slot 44 and permitting longitudinal movement of ball member 34 in the closed position thereof. Coacting flats defined by slot 44 and lower end 46 effect rotation of ball member 34 upon rotation of stem 36. Annular recesses or pockets 45 receive suitable upstream and downstream metal seats 47 for sealing against outer surface 40 of ball valve member 34.

Stem 36 includes an large diameter stem section 48 adjacent lower end 46, an intermediate diameter stem section 50 adjacent stem section 48 defining an annular shoulder 52 therebetween, a cylindrical threaded section 54 adjacent stem section 50, and an upper end threaded section 56 adjacent cylindrical threaded section 54. Upper end threaded section 56 has a pair of opposed planar or flat surfaces 58 connected by arcuate externally threaded surfaces 60.

Valve body portion 12 has an upper opening or bore receiving valve stem 36 defining a small diameter intermediate portion 62 and enlarged diameter end portions 64 and 66. Small diameter intermediate bore portion 62 defines a flange 68 between enlarged diameter end bore portions 64 and 66. A collar 70 integral with stem 36 is spaced from flange 68 by a bearing 71 and remains spaced from flange 68 even under the application of high fluid pressures within valve chamber 32. For holding stem 36 within body portion 12 and slot 30, an outer clamp or cover plate 72 is secured to body portion 12 by a plurality of threaded bolts 74. Plate 72 has a bore therethrough defining an inner large diameter bore portion 76, an intermediate diameter bore portion 78, and an outer small diameter bore portion 80.

For sealing about stem 36, a packing 82 fits within enlarged diameter bore portion 66 of body portion 12 about large diameter stem section 48 and a follower 84 is positioned over the outer end of packing 82. For exerting a continuous compressive loading against packing 82, a spring generally indicated at 85 is biased between plate 72 and packing 82. Spring 85 comprises a plurality of Belleville washers 86 received within large diameter bore portion 76 of plate 72. Washers 86 have inner marginal portions 87 exerting a downward force on follower 84 with follower 84 compressing packing 82 between stem 36 and body portion 12. A load transmitting ring 88 is mounted within large diameter bore portion 76 of clamp plate 72 between Belleville washers 86 and clamp plate 72. Ring 88 has an inner annular recess 90 receiving outer marginal portions 89 of Belleville washers 86 and defining an outer flange 92 extending downwardly along the outer periphery of washers 86.

To restore a predetermined loading against ring 88 in the event of movement of packing 82 beyond the compressive capability of springs 86, a plurality of externally threaded adjusting screws 94 are provided within internally threaded openings 96 in clamp plate 72 and have inner ends in abutting contact with the outer surface of ring 88. The outer ends of adjusting screws 94 are exposed adjacent the outer surface of plate 72 externally of ball valve 10 and have suitable sockets therein for manual engagement by an allen head wrench. To increase the compressive loading on packing 82, screws 94 are rotated inwardly to urge ring 88 inwardly against the outer marginal portions 89 of Belleville washers 86 tending to flatten Belleville washers 86 thereby to increase the compressive loading of follower 84 and packing 82. Washers 86 are of an outer diameter substantially larger than the outer diameter of packing 82 and exert a pressure on packing 82 greater than the maximum internal fluid pressure from lading within valve chamber 32 thereby to provide an inward compressive force against packing 82 at all times. Thus, back and forth axial movement or pumping of packing 82 which results in wear or deterioration is eliminated. Packing 82 particularly if formed of a compressible graphite material, has a metal ring 83 preferably formed of tantalum molded therein at its lower inner corner for contacting stem 36 and body portion 14 to prevent extrusion of packing 82 thereat.

For exerting a downward or inward loading on stem 36, a thrust ring 98 is mounted within intermediate bore portion 78 of plate 72 and fits against shoulder 52 of stem 36. Bore portion 78 defines an annular shoulder 79 and thrust 98 is compressed between shoulders 52 and 79. Thrust ring 98 may be formed of a suitable plastic material, such as polytetrafluoroethylene, which will melt or sublimate at a temperature of about 700° F. An inner nut 100 is threaded onto stem 36 over plate 72 for maintaining a predetermined compressive loading against thrust ring 98 between shoulders 52 and 79. Since stem 36 is rotated relative to thrust ring 98, a relative light loading on thrust ring 98 is normally provided. A stop plate 101 has a rectangular opening receiving stem 36. Operating handle 38 is mounted over stop plate 101 and has a generally rectangular opening 104 thereon which receives stem 36 and rotates with stem 36. A suitable washer 105 and associated spacer fit over handle 38 and a securing bolt 106 is threaded on the end of stem 36 against handle 38 and washer 105 for clamping handle 38 against stem 36. Handle 38 engages bolts 74 at the fully open and fully closed positions of ball valve member 34.

Follower 84 exerts a continuously and generally uniform loading against packing 82 even in the event of wear on packing 82 as a result of the force exerted by Belleville washers 86. Thrust ring 98 is positioned outwardly of packing 82 and thus controls the position of stem 36 independently of the force applied to packing 82 by Belleville washers 86. Further, thrust ring 98 limits the outward movement of stem 36 upon the reaching of high fluid pressures in valve chamber 32 and prevents contact of collar 70 with flange 68. However, when thrust ring 98 is consumed by high temperatures, such as may be generated by a fire or the like, stem 36 may be moved upwardly by high fluid pressure within valve chamber 32 with stem collar 70 contacting flange 68.

A secondary stem seal is provided by collar 70 against flange 68 when high temperature consumes or deteriorates thrust bearing or ring 71 as internal pressure acting against stem 36 forces collar 70 against flange 68 to provide metal to metal engagement.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In a ball valve having a body defining an enlarged diameter valve chamber with a ball valve member mounted therein, and a stem extending through an opening in said body and connected to said ball valve member for rotation of said ball valve member between open and closed positions;

an outer plate mounted on said body having a bore in alignment with said opening in said body for receiving said stem, said bore defining a large diameter bore portion on its inner side adjacent said valve body and a small diameter bore portion on its outer side;

a packing within said opening in said body about said stem;

a Belleville spring mounted within said large diameter bore portion of said plate about said stem and biased between said plate and said packing, said Belleville spring having an inner marginal portion for exerting a continuous compressive loading against said packing and having an outer diameter substantially greater than the outer diameter of said packing for defining an outer marginal portion radially outwardly of said packing; and manually adjustable means extending through said outer plate having an outer end accessible externally of the ball valve and having an inner end for exerting a predetermined compressive loading against said outer marginal portion of said Belleville spring thereby effecting a predetermined loading of said packing.

2. In a ball valve as set forth in claim 1 wherein a load transmitting ring is positioned in said large diameter bore portion of said plate over said Belleville washer, and said adjusting means comprises threaded screws having their inner ends in abutting contact with said load transmitting ring for adjustment of said ring in a direction parallel to the longitudinal axis of said stem.

3. In a ball valve as set forth in claim 2 wherein said load transmitting ring has an inner annular groove receiving said Belleville washer and defining an annular flange extending alongside said Belleville washer.

4. In a ball valve as set forth in claim 1 wherein said spring comprises a plurality of Belleville washers arranged in a stack.

5. In a ball valve as set forth in claim 1 wherein said outer plate has an intermediate diameter bore portion positioned between said large diameter bore portion and said small diameter bore portion;

a thrust bearing mounted within said intermediate diameter bore portion between opposed facing surfaces on said stem and said plate abutting said thrust bearing; and adjustment means on said stem outwardly of said plate for urging said opposed facing surfaces toward each other to provide a predetermined compressive loading on said thrust bearing.

6. In a ball valve as set forth in claim 5 wherein said stem has an annular shoulder thereon adjacent said ball valve member; and said body has a recess receiving said shoulder defining an opposed surface normally spaced from shoulder whereby upon deterioration of said thrust ring and outward movement of said stem from internal pressure said shoulder contacts said opposed surface to limit outward movement of said stem.

7. In a ball valve as set forth in claim 5 wherein said stem has an annular shoulder therein adjacent said ball valve member; and said body has a recess receiving said shoulder and defining an opposed surface for contacting said shoulder in sealing relation upon deterioration of said thrust ring;

8. In a ball valve having a body defining an enlarged diameter valve chamber with a ball valve member mounted therein, a stem connected to said ball valve member for rotation of said ball valve member between open and closed positions, and an outer plate secured to said body for securing said stem on said valve body with said stem extending through aligned openings in said body and said plate, said aligned opening in said plate including an inner large diameter bore portion, an adjacent intermediate diameter bore portion, and an outer small diameter bore portion receiving said stem; improved mounting means for said stem comprising:

a packing mounted within said opening in said body about said stem;

a spring mounted within said inner large diameter bore portion of said aligned opening in said outer plate about the stem and biased between the outer plate and said packing for continuously exerting a compressive loading against said packing;

first manually adjustable means accessible from a position outside said ball valve and extending through said plate to said inner large diameter bore portion to adjust the loading on said spring for providing a predetermined loading against said packing for sealing against said stem;

a thrust bearing mounted within said intermediate diameter bore portion of said aligned opening in said outer plate at a location outwardly of said spring and positioned between opposed facing surfaces on said stem and said plate; and second manually adjustable means on said stem for urging said opposed facing surfaces toward each other to provide a predetermined compressive loading on said thrust bearing.

9. In a ball valve as set forth in claim 8 wherein said spring comprises a plurality of Belleville washers and first manually adjustable means comprises a plurality of threaded adjusting members having ends extending within said inner large diameter bore portion for exerting a compressive loading against said Belleville washers.

10. In a ball valve as set forth in claim 9 wherein said Belleville washers have inner marginal portions adjacent their inner peripheries and outer marginal portions adjacent their outer peripheries;

said inner marginal portions exerting a compressive loading against said packing and said first manually adjustable means exerting a compressive loading against said outer marginal portions of said Belleville washers.

11. In a ball valve as set forth in claim 8 wherein said spring comprises a plurality of Belleville washers about said stem defining inner marginal portions adjacent their inner peripheries and outer marginal portions adjacent their outer peripheries;

a load transmitting ring positioned over said Belleville washers and having an outer annular flange extending alongside said Belleville washers; and said first manually adjustable means comprises a plurality of threaded adjusting members extending through said plate within said inner large diameter bore portion and having inner ends contacting said load transmitting ring over said annular flange and radially outward of said Belleville washers for exerting a compressive loading against said Belleville washers.

12. In a ball valve as set forth in claim 8 wherein said second manually adjustable means comprises a nut threaded onto said stem and exerting a compressive loading against said plate for urging said opposed facing surfaces toward each other.

13. In a ball valve having a body defining an enlarged diameter valve chamber with a ball valve member mounted therein, and a stem extending through an opening in said body and connected to said ball valve member for rotation of said ball valve member between open and closed positions;
- an outer plate mounted on said body having a bore in alignment with said opening in said body for receiving said stem, said bore defining a large diameter bore portion on its inner side adjacent said valve body and a small diameter bore portion on its outer side;
- a packing within said opening in said body about said stem;
- a spring mounted within said large diameter bore portion of said plate about said stem and having an inner marginal portion for exerting a continuous compressive loading against said packing, said spring having an outer diameter substantially greater than the outer diameter of said packing and defining an outer marginal portion radially outwardly of said packing; and
- manually adjustable means extending through said outer plate having an outer end accessible externally of the ball valve and having an inner end for exerting a predetermined compressive loading against said outer marginal portion of said spring thereby effecting a predetermined compressive loading of said packing;
- said packing including a graphite containing material and a metal ring molded thereto adjacent the lower inner corner thereof for contacting said stem and said body to prevent extrusion of said graphite containing material about said stem.

14. In a ball valve as set forth in claim 13 wherein said opposed facing surfaces are defined by opposed annular shoulders on said stem and said plate.

15. In a ball valve having a body defining an enlarged diameter valve chamber with a ball valve member mounted therein, a stem connected to said ball valve member for rotation of said ball valve member between open and closed positions, and an outer plate secured to said body for securing said stem on said valve body with said stem extending through aligned openings in said body and said plate; improved mounting means for said stem comprising:
- a packing mounted within said opening in said body about said stem including a metal ring molded to the lower corner of said packing for contacting said stem and said body to prevent extrusion of said packing about said stem;
- a spring mounted within said aligned opening in said outer plate about the stem and biased between the outer plate and said packing for continuously exerting a compressive loading against said packing;
- manually adjustable means accessible from a position outside said ball valve to adjust the loading on said spring for providing a predetermined loading against said packing for sealing against said stem;
- a thrust bearing mounted within said aligned opening in said outer plate at a location outwardly of said spring and positioned between opposed facing surfaces on said stem and said plate; and
- manually adjustable means on said stem for urging said opposed facing surfaces toward each other to provide a predetermined compressive loading on said thrust bearing;
- said spring comprising a plurality of Belleville washers and said manually adjustable means comprising a plurality of threaded adjusting members for exerting a compressive loading against said Belleville washers.

* * * * *